United States Patent Office 2,809,181
Patented Oct. 8, 1957

2,809,181

OIL SOLUBLE PHENOL-ALDEHYDE RESINS

John Harry Wallice Turner, Eastgate, Cowbridge, and Leonard Ralph Anthony and Peter Lionel Bramwyche, Penarth, Wales, assignors to The Distillers Company Limited, Edinburgh, Scotland, a British company No Drawing. Application March 15, 1954,
Serial No. 416,393

Claims priority, application Great Britain March 26, 1953

5 Claims. (Cl. 260—43)

The present invention relates to a process for the production of a novel class of oil-soluble synthetic resins derived from phenol-aldehyde condensation products. It further relates to the oil-soluble resins so produced. By the expression "oil-soluble" is meant that the resin can be dispersed or dissolved in a vegetable oil to give a clear stable solution which is capable of being thinned with a hydrocarbon solvent.

Various processes have been suggested for the production of oil-soluble phenol-aldehyde condensation products. For instance, the condensation reaction of the phenol and the aldehyde may be carried out in the presence of the vegetable oil so that a homogeneous solution is produced. Furthermore phenol-aldehyde condensation products which are soluble in oils may be prepared from substituted phenols, particularly those with a hydrocarbon substituent in the para-position to the hydroxyl group, for instance para-tertiary-butyl phenol and para-phenyl phenol. However, it is not easy to prepare oil-soluble phenol-aldehyde condensation products from unsubstituted phenols such as phenol itself or from phenols whose sole substituents are methyl groups and particularly from those have a free para-position. Moreover, many of the oil-soluble phenol-aldehyde condensation products which have been produced are heat-hardenable i. e. of the resole type.

An object of the present invention is to provide a process for the production of thermoplastic oil-soluble resins from phenols which have not hitherto been widely used in the production of such resins. A further object of the present invention is to provide a process for the production of oil-soluble resins from phenol-aldehyde novolak condensation products which are substantially oil-insoluble.

According to the present invention the process for the production of an oil-soluble resin comprises reacting a substantially oil-insoluble novolak resin with styrene, or a reactive homologue thereof, at an elevated temperature in the presence in the reaction mixture of an acid catalyst.

Any substantially oil-insoluble novolak resin may be used in the process of the present invention. Such resins are prepared by conventional procedures from monohydric phenols such as phenol itself and its methyl-substituted homologues such as the cresols and the xylenols. Other higher substituted phenols and particularly para-substituted phenols are generally not suitable for the production of novolak resins for use in the present invention because they give rise to novolak resins which are oil-soluble.

The aldehyde used in the production of the substantially oil-insoluble novolak resins for use in the process of the present invention is most suitably formaldehyde or its polymers such as paraform.

The relative proportions of monohydric phenol to aldehyde used in the production of the substantially oil-insoluble novolak resins are those customarily used in the art. The chief effect of variations in the phenol-aldehyde ratio is to change the melting point of the resultant oil-soluble resin. In general it is preferred that from 0.6 to 1.6 moles of formaldehyde should be employed for each mole of monohydric phenol used in the production of the oil-insoluble novolak resin.

It is preferred that styrene should be reacted with the oil-insoluble novolak resin according to the present invention but all or part of the styrene employed in the process may be replaced with a reactive homologue thereof such as the nuclear alkyl- and chloro-substituted derivatives thereof.

The proportion of oil-insoluble novolak resin to styrene employed in the process of the present invention may be varied widely without substantially affecting the oil solubilities and other physical characteristics of the resultant resin. Proportions by weight of novolak resin to styrene may be varied widely, for instance from 0.1 to 4 parts by weight of novolak resin to 1 part of styrene, but the most useful products result from the reaction of 1 part of novolak resin with from 0.5 to 2 parts of styrene.

Many strongly acidic compounds are suitable as catalysts for the process of the present invention and as examples may be mentioned, sulphuric acid, hydrofluoric acid, fluorosulphonic acid or borofluoracetic acid, acid reacting materials such as aluminum chloride, stannic chloride, boron trifluoride and their solutions or complexes with organic solvents, acid-activated earths and mixtures of any of the above. Weaker acidic compounds such as boric acid or organic carboxylic acids generally are not sufficiently active to bring about the process of the present invention within a reasonable time. However, boric acid or other compounds or boron when used in conjunction with a dicarboxylic acid or with a hydroxy carboxylic acid having hydroxy and carboxylic groups attached to adjacent carbon atoms have sufficient activity to bring about the process of the present invention. Examples of carboxylic acids which may be used in conjunction with the boron compounds such as boric acid are oxalic, tartaric, lactic and salicylic acids.

The process of the present invention is strongly exothermic and consequently the reaction mixture may have to be cooled in order that the reaction may be kept under control. Other standard techniques for controlling the reaction such as adding the styrene or the acid catalyst slowly to the reaction mixture may be employed in ways which are known to those skilled in the art.

The process of the present invention can be carried out in the presence of an inert solvent or diluent, such as a mixture of saturated aliphatic hydrocarbons or halogenated hydrocarbons, and thus the heat evolved during the reaction may be dissipated by allowing it to proceed in the presence of a solvent under reflux conditions.

The temperature at which the process of the present invention is allowed to proceed may be varied widely depending on the activity and quantity of acid catalyst employed. With an active catalyst such as, for instance, boron trifluoride the reaction may be initiated at 50° C. and the temperature of the reaction mixture allowed to rise due to the exothermic nature of the reaction. Generally it is preferred to hold the temperature of the reaction mixture between 90 and 150° C. for a period before finally heating the mixture to a temperature of about 200° C. or above to complete the reaction. It is believed that a certain degree of molecular rearrangement takes place during this stage of the process.

The products of the present invention may be used for a wide variety of purposes and in particular they may be dissolved in vegetable oils particularly those oils possessing conjugated unsaturation such as china wood or tung oil and oiticica oil, and used in the production of varnish coating compositions. Other applications include the addition of these resins to rubber for tackifying, reinforcing and increasing its resistance to oxidation.

The following examples illustrate specific methods of carrying out the process of the present invention, the parts referred to being by weight:

Example 1

A conventional type of phenol novolak resin which was substantially oil-insoluble, was prepared by mixing 80 parts of formalin solution (40% w./w.), 100 parts phenol and 0.6 part of oxalic acid. The mixture rapidly became turbid and refluxing was continued for a further 80 minutes when the excess water was removed by distillation under vacuum, the temperature being gradually raised to 125° C., yielding a solid resin of melting point 80° C. 100 parts of this resin were melted, and 33 parts of styrene added, followed by 0.3 part of a boron trifluoride/phenol complex (25% boron trifluoride). A further 37 parts of styrene were then added gradually and the mixture held for ¼ hour at 130° C. and then poured out on a metal tray and allowed to cool. The product was an oil-soluble resin of melting point approximately 85° C. (ball and ring).

Example 2

A conventional novolak resin was prepared as follows: 100 parts of cresylic acid (52% m-cresol), 50 parts of commercial 40% formalin, 0.6 part of oxalic acid dissolved in 1 part of water, were charged into a flask and heated under reflux for 8–90 minutes after which the resin was dehydrated by heating under vacuum to 125° C. to produce a hard, brittle oil-insoluble resin.

750 parts of the above novolak resin were melted in a flask and 750 parts of styrene added slowly with stirring. When the mixture was homogeneous, the temperature was adjusted to 115° C. and 2.75 mls. of the boron trifluoride phenol complex used in Example 1, added. A vigorous reaction ensued which was controlled by cooling. The reaction was then completed by heating the mixture for 1 hour at 200° C. to produce a pale coloured resin, melting point 51° C. which was soluble in tung oil.

Example 3

25 parts of the phenol novolak resin described in Example 1 were dissolved in 50 parts of styrene and the temperature adjusted to 95° C. 0.25 ml. of boron trifluoride acetic acid complex were added, and the temperature rise controlled by cooling. The reaction was completed by heating to 195° C. and holding the reaction mixture at this temperature for 1 hour. The product was soluble in tung oil.

Example 4

A conventional substantially oil-insoluble novolak resin was prepared as follows: 100 parts of A. D. F. cresol, 50 parts of 40% formalin, 0.6 part of oxalic acid and 1 part of water were heated under reflux for 1 hour, and the resin dehydrated by vacuum distillation to 125° C.

500 parts of the above cresol novolak were melted and 500 parts of styrene added, and the temperature adjusted to 85° C. 2 parts of oxalic acid and 2 parts of boric acid were then added. The reaction proceeded smoothly and at 130° C. an extra 1 part of oxalic acid and 1 part of boric acid were added to ensure completion of the reaction. The temperature was then raised to 190° C. and maintained for 1 hour. This gave a soft resin, melting point 35° C., which was soluble in raw wood oil with slight heating.

Example 5

250 parts of the cresol novolak described in Example 2 were melted and dissolved in 250 parts of styrene and the temperature adjusted to 90° C. 0.6 ml. of fluoro sulphonic acid were added, when an exothermic reaction took place, and the temperature rose to 130° C. This temperature was then maintained by careful cooling until the reaction subsided when the temperature was raised to 200° C. and this temperature was held for 1 hour. Resulting product was a dark resin with a melting point of 50° C. which was soluble in wood oil.

Example 6

250 parts of the cresol novolak used in Example 2 were melted and dissolved in 250 parts of styrene, in a flask fitted with a reflux condenser and Dean & Stark pattern trap. The solution was refluxed for a short time to remove any traces of water present in the resin, and the temperature then adjusted to 90° C. 1.5 parts of aluminum chloride, dissolved in 15 parts of di-ethyl benzene, were then added and the temperature allowed to rise to 150° C. and maintained at that temperature until the reaction was almost complete. The temperature was then raised to 200° C. and maintained for 1 hour. The product was a brown resin of melting point 38° C. which was soluble in raw wood oil.

Example 7

A varnish of 2:1 oil length was prepared by heating 200 parts of raw wood oil to 150° C. and adding 100 parts of the oil-soluble resin prepared in Example 2 over a period of 5 minutes. The temperature was held for 15 minutes at 150° C. and then raised to 230° C. for 15 minutes. The bodied resin/oil composition was then thinned to a viscosity of 80 seconds (B. S. S. flow cup at 25° C.) by the addition of 45 parts of a solvent known as Petrocarbon 15/9 (a solvent made up of a mixture of aromatic compounds having a boiling range of 155 to 185° C.; it is equivalent to a good quality grade of naphtha and was developed by Petrochemicals Ltd. of England to replace xylol as a paint solvent), to 92 parts of composition, and cobalt equivalent to 0.055% on the oil added in the form of 4 parts of solution of cobalt naphthenate in white spirit. This varnish, when air dried, gave a film which possesed very good water and alkali resistance.

We claim:

1. A process for the production of a thermoplastic oil-soluble resin which comprises reacting a monohydric phenol novolak resin which is insoluble in vegetable oils with a compound selected from the group consisting of styrene, nuclearly alkyl-substituted styrene and nuclearly chloro-substituted styrene at a temperature above 50° C. in the presence in the reaction mixture of an acid catalyst.

2. A process as claimed in claim 1, wherein the novolak resin is prepared by the condensation of a monohydric phenol selected from the group consisting of phenol and a cresol with formaldehyde.

3. A process as claimed in claim 1, wherein the acid catalyst is selected from the group consisting of boron trifluoride, a complex thereof and a mixture of boric acid with oxalic acid.

4. A process as claimed in claim 1, wherein the reaction mixture is maintained during the first part of the reaction at a temperature in the range 90 to 150° C. and thereafter the reaction is completed by heating the mixture to about 200° C.

5. A thermoplastic oil-soluble resin obtained by reacting a monohydric phenol novolak resin which is insoluble in vegetable oils with a compound selected from the group consisting of styrene nuclearly alkyl-substituted styrene and nuclearly chloro-substituted styrene, at a temperature above 50° C. in the presence in the reaction mixture of an acid catalyst.

References Cited in the file of this patent

UNITED STATES PATENTS

| 1,831,462 | Moss | Nov. 10, 1931 |
| 2,114,121 | Bender | Apr. 12, 1938 |
| 2,374,316 | Whiting | Apr. 24, 1945 |

FOREIGN PATENTS

| 839,233 | France | Dec. 26, 1938 |
| 879,199 | France | Nov. 10, 1942 |

UNITED STATES PATENT OFFICE

CERTIFICATE OF CORRECTION

Patent No. 2,809,181                           October 8, 1957

John Harry Wallice Turner et al.

It is hereby certified that error appears in the printed specification of the above numbered patent requiring correction and that the said Letters Patent should read as corrected below.

Column 1, line 37, for "have" read -- having --; column 3, line 30, for "8-90 minutes" read -- 80-90 minutes --; column 4, line 37, for "possesed" read -- possessed --; line 63, claim 5, after "styrene", first occurrence, insert a comma.

Signed and sealed this 7th day of January 1958.

(SEAL)
Attest:

KARL H. AXLINE                                       ROBERT C. WATSON
Attesting Officer                                  Commissioner of Patents